Dec. 29, 1959   H. F. PUPPOLO   2,919,213
POLYTETRAFLUOROETHYLENE SUSPENSIONS AND
METHOD OF COATING WIRE WITH SAME
Filed May 31, 1956
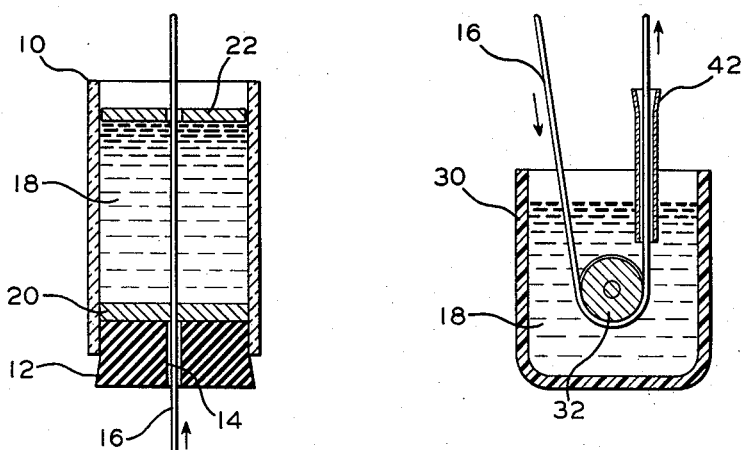
FIG. 1
FIG. 2
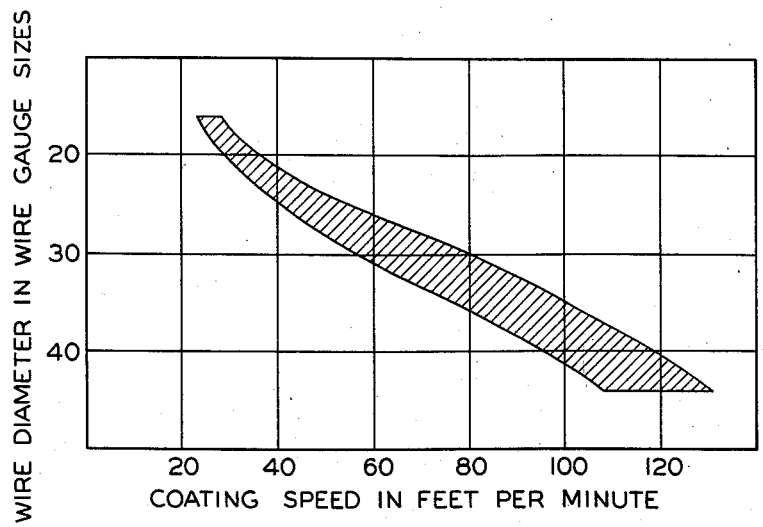
FIG. 3
INVENTOR.
HENRY F. PUPPOLO
BY Roland a Dexter
HIS ATTORNEY

United States Patent Office 2,919,213
Patented Dec. 29, 1959

2,919,213

POLYTETRAFLUOROETHYLENE SUSPENSIONS AND METHOD OF COATING WIRE WITH SAME

Henry F. Puppolo, North Adams, Mass., assignor to Sprague Electric Company, North Adams, Mass., a corporation of Massachusetts Application May 31, 1956, Serial No. 588,313

6 Claims. (Cl. 117—224)

This invention relates to coating wire with resins, and more particularly to coating electric conductor wire with suspensions of synthetic organic dielectric resins in aqueous media.

This application is a continuation-in-part of my co-pending application, Serial No. 371,439, filed July 31, 1953, and thereafter abandoned.

To make possible the effective coating of wires and foils with synthetic organic wire coating resins suspensoids, notably fluorinated ethylene polymers and acrylic polymers, by such simple means as dipping in a suspension of the resins, relatively high concentrations of resin are required in the suspension. Commercially available concentrations of these resins may be obtained in which concentrations of 35% to 75% of resin in aqueous collodial dispersions are present.

These commercially available dispersions, though of satisfactory concentration, are not always satisfactory for use as wire coating resins unless the coating is effected at very limited speeds. Even then the resultant product tends to have too many discontinuities in the coating and may lack satisfactory abrasion resistance.

It is an object of this invention to overcome the foregoing and related disadvantages of the prior art. It is a further object of this invention to produce resin wire coating suspensions which will permit coating at speeds considerably higher than currently possible. It is a further object of this invention to provide resin wire coating suspensions which will produce an even, tough, continuous, and abrasion resistant coating on the wire.

The above as well as still further objects of the present invention will be more completely understood from the following description, with reference being made to the accompanying drawings wherein: Fig. 1 is a sectional view of an apparatus suitable for use in the application of coatings persuant to the instant invention; Fig. 2 is a sectional view of another embodiment of wire coating apparatus suitable for use in the application of coatings persuant to the instant invention; and Fig. 3 is a shaded curve diagram illustrating some of the coating conditions in accordance with the present invention.

In accordance with the present invention, it has been discovered that improved coatings are obtained from aqueous suspensions of the above named wire coating resins when the suspensions contain a cresol, aluminum chloride, or both a cresol and aluminum chloride. When cresol is used, better results and higher coating speeds are made possible if and when the cresol containing suspension also contains a small amount of material of the class consisting of alkali metal salts of salicylic acid and alkali metal salts of phenobarbitol. When the suspension contains aluminum chloride, it is improved by the presence of relatively large amounts of dispersing agents.

The addition of the cresol and/or aluminum chloride to the wire coating resin suspensoid permits wire coating by either dip or electrophoretic means at relatively high coating speeds.

The use of cresol and/or aluminum chloride further permits the coating of either bare or ceramic coated wires. Without limiting the invention in any way, the following example illustrates its use in conjunction with ceramic coated wire such as that described in U.S. Patent 2,707,703 issued May 3, 1955, to Stanley O. Dorst.

*Example 1*

An aqueous suspension of polytetrafluoroethylene particles averaging about ½ micron in size, commercially obtainable in high resin concentrations under the trade name "Teflon," was adjusted to a resin content of 50% by weight by the addition of water.

To 100 grams of the dilluted suspension there was added 2.6 grams of a solution prepared by dissolving 1 part by weight of sodium salicylate in 1000 parts by weight of hot (80° C.) mixed cresol (technical grade, as obtained from coal tar distillation and having a boiling range from 185 to 285° C.)

The final product was poured into a coating cell of the type illustrated in Figs. 1 and 2. The cell shown in Fig. 1 consists of a vertical glass tube 10 open at both ends. One end of tube 10 is plugged by a rubber stopper 12 having a passageway 14 drilled through the stopper. The stopper 12 and tube 10 are held vertically disposed so that wire 16 can be threaded through passageway 14 and tube 10 for a vertical pass. Immediately above stopper 12 a small quantity of mercury 20 is introduced to provide a height of about at least ⅛" above the top of the stopper. Within tube 10 is placed the above described mixture 18 so as to cover at least 2" of the height of wire 16. The passageway 14 is made only slightly (10 to 20 mils) wider than the width of wire 16 so that the suspension 18 will not leak through to any appreciable extent even if the mercury 20 is not utilized. However, the presence of mercury makes a very effective seal and substantially completely prevents any penetration of the suspension 18 into passageway 14. Should any of the resin particles find their way into the passageway they tend to coagulate, thereby obstructing the passageway and interfering with the passage of wire 16 and producing an inferior coating. Above suspensoid 18 a wire coating die 22 is floated so as to keep the surface of the coating resin as still as possible and to provide a reduced passage for wire 16 so as to ensure an even cone of coating suspension being pulled out by the passage of the wire.

A No. 32 AWG copper wire coated with an 0.3 mil thickness of ceramic particles, pursuant to the above identified Dorst patent, is passed upwardly through the cell in the manner illustrated in Fig. 1 at a speed of 78 feet per minute, as shown to be proper by the Fig. 3 wire coating speed graph. This wire is then passed through a dryer chamber heated to 500° F. to evaporate most of the suspending medium from the coating material picked up by the surface of the wire as it moves out of the coating cell. The wire is then passed through a sintering oven heated to 1300° F. This oven is long enough so that the rapidly moving material reaches a temperature within 100 to 200° F. of the oven temperature before it emerges. At this temperature the resin particles picked up by the wire during the passage through the coating mixture are sintered together to provide a thin but uniform resin coating around the ceramic covered wire. The resulting resin coating after cooling, either by quenching as in cold water or slow cooling in air, will show a very high uniformity and fewer than three breaks per 100 feet of length. The resin coating is approximately 0.8 mils thick and has a dielectric strength approximately 2400 volts per mil of thickness.

A modification of the above example which produces another coating of high uniformity and low incidents of coating breaks is obtained when the coating suspension also contains 0.06% of aluminum chloride (AlCl₃ provided in anhydrous form or in its equivalent of hydrative material) based on the total weight of resin.

Further improvements are also obtained when a dispersing agent, in concentrations of about 1 to 5% based on the total weight of the resin, is added to the aluminum chloride containing suspension. Effective dispersing agents include the alkyl-phenoxy, alkoxy alkane sulfonate salt type compounds. Alkali metal salts of alkyl sulfuric acids, sodium lauryl sulfate for example, and similar salts of condensation products of formaldehyde with naphthalene sulfonic acids are also suitable. In general, it appears that any dispersing agent can be used whether it be cationic, anionic, or non-ionic. With higher concentration of such coating agents, those that are non-ionic can be driven off completely by the sintering treatment and have the advantage of not leaving so much electrically conductive contaminates in the final resin coating. In place of the aluminum chloride, aluminum bromide can be used with approximately equal results.

Some polytetrafluoroethylene suspensions obtained commercially tend to produce a relatively dark colored coating. The addition of aluminum chloride with or without the wetting agent has been discovered to avoid such discoloration and enable the production of coatings more uniform in color as well as in electrical characteristics. When the cresol is added to the polytetrafluoroethylene suspension, there is a notable increase in viscosity. This increase is not as sharp when the cresol also contains the alkali metal salicylate or alkali metal salt of luminol. The most effective viscosities appear to be those within the range of 20 to 40 as measured at room temperature by a Brookfield Synchrolectric viscometer using a No. 2 LVF spindle rotating at 12 turns per minute. It appears that the increase in viscosity provides a greater uniformity of pickup so that better coatings are produced, and also that the coating can be carried out at a higher speed. Without the above organic salt addition to the cresol, it appears that the viscosity becomes so high that the drag-out of coating composition increases unduly and tends to produce an uneven coating.

As an alternative to the rubber stopper mercury seal type of closure for the coating cell, a cell may be provided which has an upstanding boss member upon which is mounted a conventional baby bottle nipple. The wire is threaded through the hole in the nipple so that the nipple acts as a seal and also provides a wiping action on the wire preventing carry-over from any previous treating cell, thereby tending to reduce contamination.

*Example II*

As a second example of utility for my novel cresol containing wire coating resins, bare copper wire was coated with an aqueous suspension of acrylic polymer wire coating resin, commercially available under the trade name "Lecton." While 20% resin content has been found to be an optimum operating condition with Lecton, it should be noted that for high resin content applications a resin content of up to 32% has been found suitable. With Lecton it has been found that the addition of 1.5 cc. of ammonium hydroxide added to 100 grams of the suspensoid produces an improved coating action. The further addition of 0.5 gram of dispersing agent to the 100 grams suspensoid also has been found to be advantageous. To this 100 grams of suspensoid is added 2.5 cc. of cresol. The final product is poured into the coating cells shown in Fig. 1 and 2, if dip coating is to be utilized, or into an electrophoretic coating cell as shown in the aforementioned Dorst Patent 2,707,703, if electrophoretic type coating is to be used.

The cell depicted in Fig. 2 is described in detail in my copending application Ser. No. 550,544, filed December 2, 1955. In general this cell consists of a glass, plastic, or other inert tank 30 open at the top and in which is mounted a chrome plated stainless steel pulley sheave 32. Located tangentially to pulley 32 is a glass tube 42 which serves to provide a "zone of quiet" for the wire as it leaves the coating solution. The purpose of this glass tube, which is analogous to floating die 22 in Fig. 1, is to ensure an even coating as the wire pulls-out through the solution. If this tube were not utilized there would be a considerable amount of surface motion of the coating fluid caused by the run of the wire through the solution and by the rotation of the pulley. Inasmuch as it is believed that wire coating occurs primarily at the point where the wire leaves the coating solution, it is important that the wire leave through a smooth surface to ensure that the wire picks up the coating in a true cone shape.

It should be understood that the two examples given above are illustrative only and are not intended to limit the invention to the particular polymers with the particular apparatus. Another suitable synthetic organic wire coating resin is polychlorotrifluorethylene, commercially available under the trade name "Kel-F." A further modification within the scope of this invention is to provide a plurality of layers of the coating resins. These multi-layer coatings could be either all of the same coating compositions, or one layer of one composition and other layers of other of the coating compositions herein disclosed.

Fig. 3 shows the preferred ranges of coating speeds which as indicated vary somewhat with the diameter of the wire that is to be coated. Finer wires may be coated at much higher speeds than heavier wires notably because a heavier wire coating thickness is needed with the heavier wires. However, where coatings lighter than usual are to be applied to wire, coatings speeds even faster than those indicated at Fig. 3 may be used. Coating speeds are generally from about 100 to 140 feet per minute for 0.5 mil coatings and from about 22 to 40 feet per minute for 1.3 mil coatings with intermediate speeds according to immediate thicknesses.

The present invention is very effective when used with fluorinated ethylene polymers and acrylic polymer suspensions in which the resin particles are not larger than about 1 micron in size. When the resin concentration drops too low, slower speeds are necessitated and the character, particularly the uniformity of the coating, begins to suffer noticeably even with the addition of cresol.

The results described above are obtained with mixed cresols of commercial grade, and are also obtained in substantially the same degree with purified cresols as well as with pure ortho, meta, or para cresol. The concentration of the cresol can vary from less than about 1% to 3½% by weight of the suspended resin and still provide the advantages of the present invention. Instead of sodium salicylate, other alkali metal salts of salicylic acids such as lithium, potassium, rubidium or cesium salts as well as the same alkali metal salts of luminal may be used. The phenobarbital referred to above is a common name for 5-ethyl-5-phenylbarbituric acids. The concentration of these compounds should be between about 0.01% to about 1% of the weight of cresol. The compounds need not be preliminarily dissolved in cresol but can be added separately if desired. In such case, however, the addition is not fully effective until after a few hours has elapsed. Correspondingly, the compounds need not be dissolved in the cresol but can merely be suspended in it, thereby avoiding the heating operation that is required to induce the solution.

Desired effect of aluminum chloride is obtained when it is used in the range of about 0.03% to about 0.2% of the weight of the suspended resin. Where the dispersing agent is also used, dispersing agent concentrations greater than about 5% of the weight of the suspended resin do not appear to be needed. If the dispersing agent is present at a concentration less than about 1% of the weight of the suspended resin, the effect of this agent is remarkably reduced.

Coating speeds lower than those indicated in the shaded area of Fig. 3 can be used to coat with the liquid coating compositions of the present invention. However, this generally results in heavy coatings and is not desirable by reason of the relatively high cost of the resin. The optimum resin content of the coating suspension is about 50% by weight for polytetrafluoroethylene and about 20% by weight for the acrylic polymer, although wires having diameters thicker than No. 26 AWG are advantageously used with suspensions of somewhat lower concentration. While as has been stated above, it is not necessary to use the coating cells depicted in Figs. 1 and 2, it is however desirable that the wire be moved in a straight line from the coating suspension right through the sintering ovens and even until the resin coating has cooled down to well below its transition temperature.

The advantages and desirable results described above are also obtained when the coating is applied to metal foils either bare or ceramic coated. Metals of all sorts such as copper, nickel, Nichrome, cupron, aluminum, iron, both high and low carbon steels, brass, bronze, platinum, gold, and silver are effectively coated in this manner. The coating suspensoids of this invention may be utilized whether the metal to be coated is tinned or untinned. In the coating of foils, care should be taken to ensure uniformity of the coating inasmuch as it tends to be thinner at the edges of foil. A corresponding edge thinning is also evident when wires of square, rectangular, or other angular cross-sections are coated. To counteract such edge thinning, the coating can be subjected to air blasts suitably directed to blow some of the thicker portions at the center to the thinner portions while the coating is still in a flowable condition, that is, before it passes through the drying chambers. Alternatively, the dip treatment can be combined with the electrophoretic step as by connecting the wire as one electrode and providing another suitably connected electrode in cooperative relationship in the coating suspension. In this way, a controllable electrophoretic step can be provided just before the material being coated emerges from the coating suspension. Inasmuch as electrophoretic coating takes place preferentially at the corners or angular portions of the material being coated, this technique will build up the coating at the places where it tends to be thinner. The details of such electrophoretic treatment are given in the above mentioned Dorst Patent 2,707,703.

The coating of the present invention can also be applied to other articles such as those having resin, varnish, or rubbery surfaces. By way of example, the above coating technique using the suspensions herein described and containing all the desired additives herein described, is highly effective for applying a second resin coating over the resin coating product produced in accordance with Examples I and II.

As many widely different embodiments of this invention may be made without departing from the spirit and scope thereof, it is to be understood that the invention is not limited to the specific embodiments hereof except as defined by the appended claims.

What is claimed is:

1. A liquid coating composition comprising an aqueous suspension of polytetrafluoroethylene particles of less than one micron in size suspended in an aqueous medium at a concentration of at least 50% by weight, said medium containing cresol in an amount of about 1% to about 3.5% by weight of suspended resin and a compound of the class consisting of the alkali metal salts of salicyclic acid and alkali metal salts of phenobarbital in an amount from 0.01% to about 1% of the weight of the cresol.

2. A liquid coating composition comprising an aqueous suspension of solid acrylic resin polymer particles of less than one micron in size suspended in a medium in a content of from 20% to 32% by weight, said medium containing cresol in an amount of about 1% to about 3.5% by weight of the suspended resin and a compound of the class consisting of alkali metal salts of salicylic acid and alkali metal salts of phenobarbital in an amount of from 0.01% to about 1% of the weight of the cresol.

3. A liquid essentially polytetrafluoroethylene coating composition having polyetetrafluoroethylene resin particles less than about 1 micron in size suspended in an aqueous medium at a concentration of at least about 30 percent by weight, said medium containing a cresol in an amount of from about 1 percent to about 3.5 percent of the weight of the suspended resin, the composition also includes a compound of the class consisting of alkali metal salts of salicylic acid and alkali metal salts of phenobarbital, said compound being present in an amount of from 0.01 percent to about 1 percent of the weight of cresol present.

4. A method of coating elongated wires with a member of the class consisting of fluorinated ethylene polymers and solid acrylic polymers which method comprises continuously passing the wires through at least about 2" of the resin coating composition as set forth in claim 7 so as to withdraw the wire from the composition with a quantity of the composition deposited uniformly over the wire surface, the passing being effected at a speed ranging from about 100 to 140 feet per minute for a 0.5 mil coating to from about 22 to 40 feet per minute for a 1.3 mil coating, and then sintering the resin deposit thus picked up by the wire.

5. A method of coating elongated wires with a member of the class consisting of fluorinated ethylene polymers and solid acrylic polymers which method comprises continuously passing the wires through at least about 2" of the resin coating composition as set forth in claim 2 so as to withdraw the wire from the composition with a quantity of the composition deposited uniformly over the wire surface, the passing being effected at a speed ranging from about 100 to 140 feet per minute for a 0.5 mil coating to from about 22 to 40 feet per minute for a 1.3 mil coating and then sintering the resin deposit thus picked up by the wire.

6. A method of coating elongated wires with polytetrafluoroethylene, which method comprises continuously passing the wire through at least about two inches of the resin coating composition of claim 3 so as to withdraw the wire from the composition with a quantity of the composition deposited uniformly over the wire surface, the passing being effected at a speed ranging from about 100 to 140 feet per minute for a 0.5 mil coating to from about 22 to 40 feet per minute for a 1.3 mil coating and then sintering the resin deposit thus picked up by the wire.

References Cited in the file of this patent

UNITED STATES PATENTS

| | | |
|---|---|---|
| 2,125,364 | Waldron | Aug. 2, 1938 |
| 2,203,241 | Waldron | June 4, 1940 |
| 2,547,047 | Saums et al. | Apr. 3, 1951 |
| 2,624,690 | Leader | Jan. 6, 1953 |
| 2,668,157 | Emig et al. | Feb. 2, 1954 |
| 2,686,767 | Green | Aug. 17, 1954 |

FOREIGN PATENTS

| | | |
|---|---|---|
| 629,787 | Great Britain | Sept. 28, 1949 |

UNITED STATES PATENT OFFICE

CERTIFICATE OF CORRECTION

Patent No. 2,919,213                                              December 29, 1959

Henry F. Puppolo

It is hereby certified that error appears in the printed specification of the above numbered patent requiring correction and that the said Letters Patent should read as corrected below.

Column 6, line 28, for the claim reference numeral "7" read -- 1 --.

Signed and sealed this 21st day of June 1960.

(SEAL)
Attest:

KARL H. AXLINE                                              ROBERT C. WATSON
Attesting Officer                                          Commissioner of Patents